Nov. 17, 1970   L. JOHANSON   3,541,291
PRECISION ADJUSTED ELECTRICAL DISCHARGE MACHINE
Filed Aug. 6, 1968

Lars Johanson
INVENTOR.

BY *Clarence A. O'Brien*
and *Harvey B. Jacobson*
Attorneys

Lars Johanson
INVENTOR.

Nov. 17, 1970
L. JOHANSON
3,541,291
PRECISION ADJUSTED ELECTRICAL DISCHARGE MACHINE
Filed Aug. 6, 1968
6 Sheets-Sheet 3
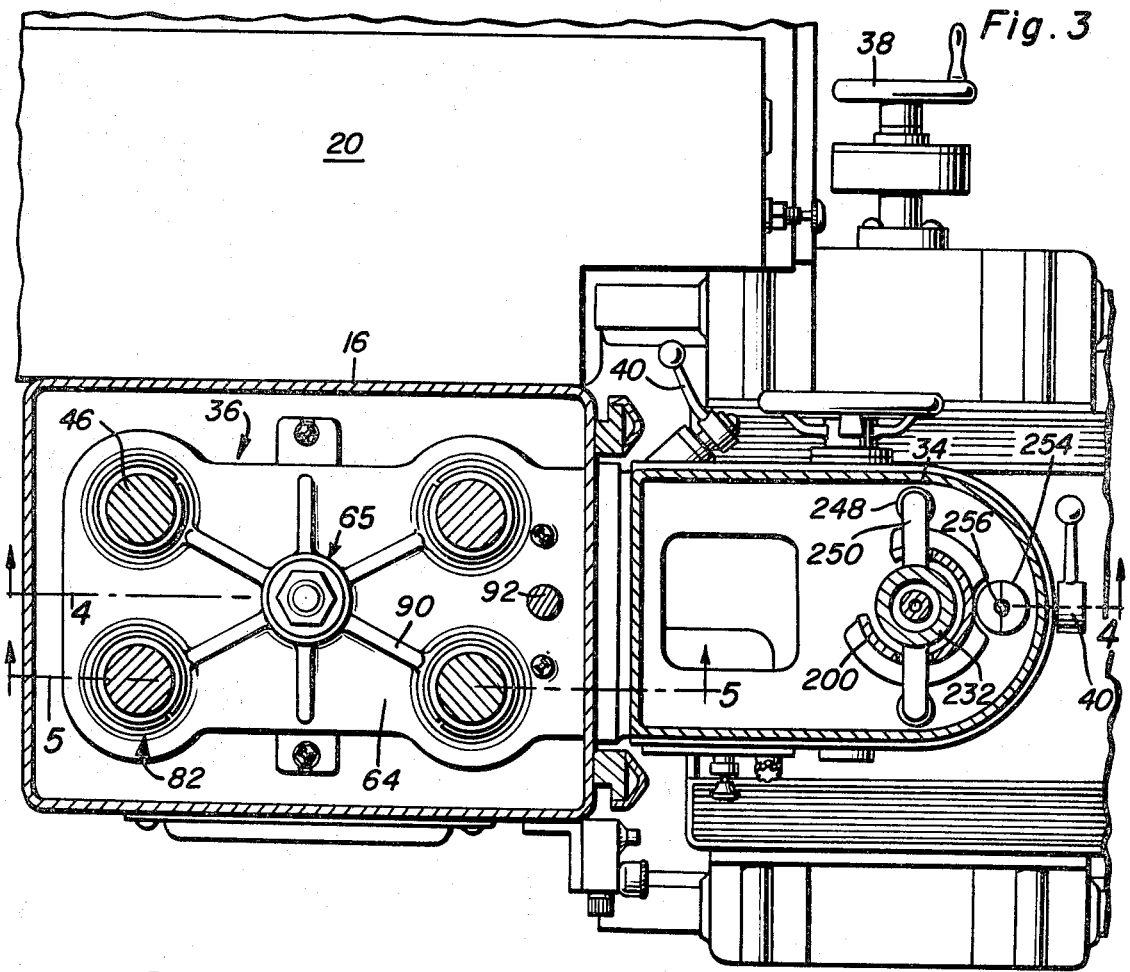
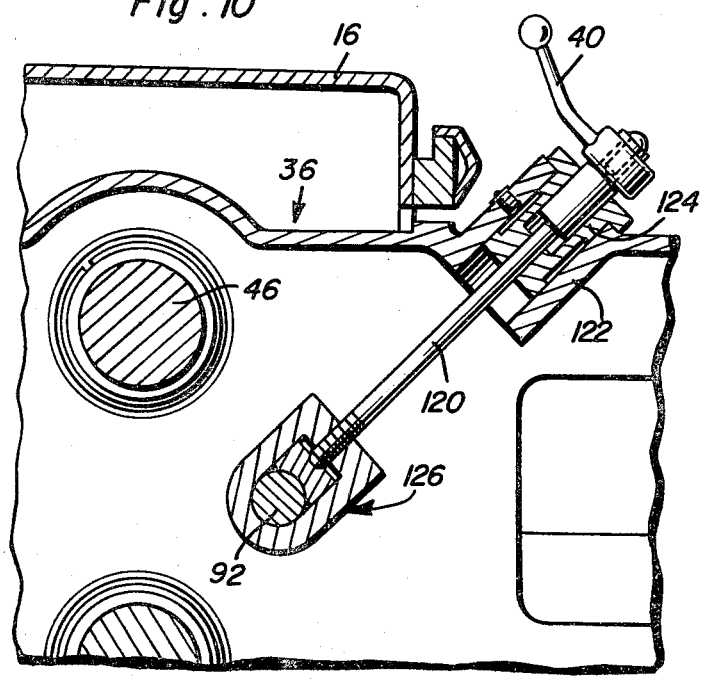
Lars Johanson
INVENTOR.
BY *Clarence A. O'Brien*
*and Harvey B. Jacobson*
Attorneys

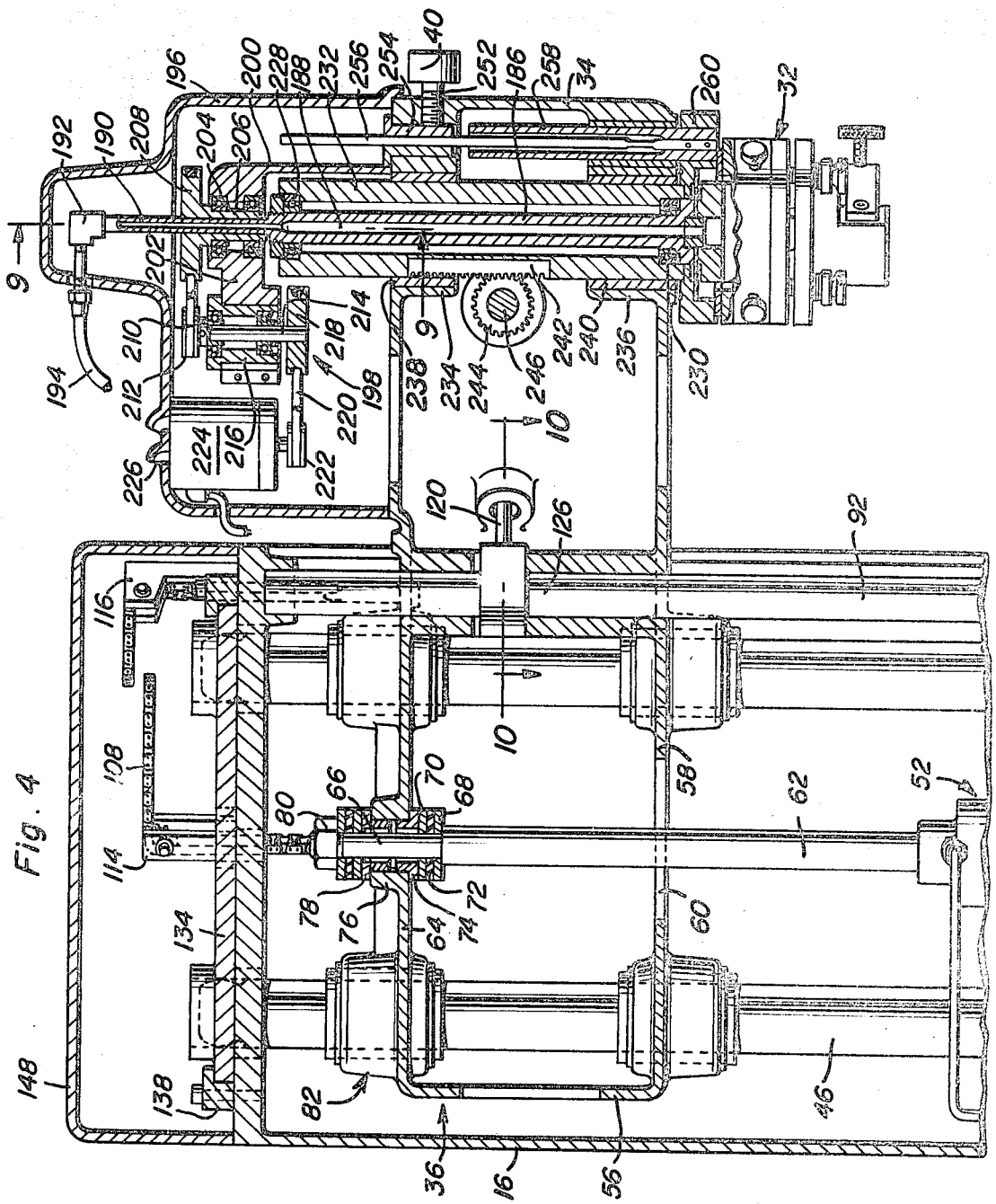

Lars Johanson
INVENTOR.

Nov. 17, 1970 L. JOHANSON 3,541,291
PRECISION ADJUSTED ELECTRICAL DISCHARGE MACHINE
Filed Aug. 6, 1968 6 Sheets-Sheet 6

Lars Johanson
INVENTOR.

BY *Clarence A. O'Brien
and Harvey B. Jacobson*
Attorneys

United States Patent Office 3,541,291
Patented Nov. 17, 1970

3,541,291
PRECISION ADJUSTED ELECTRICAL DISCHARGE MACHINE
Lars Johanson, West Caldwell, N.J., assignor to Eltee, Inc., a corporation of New Jersey
Filed Aug. 6, 1968, Ser. No. 750,696
Int. Cl. B23p 1/08; B30b 5/00; F16c 1/26
U.S. Cl. 219—69
17 Claims

ABSTRACT OF THE DISCLOSURE

The path of movement of the head section of an electrical discharge machine is adjusted with a high degree of precision for vertical motion of the rotating spindle after the machine housing is firmly anchored and leveled, by adjustment of four guide columns guiding movement of the carriage on which the head section is mounted. The guide columns are pivotally and slidably connected at upper and lower ends to anchor plates slidably mounted with the housing for displacement to adjusted positions.

---

This invention relates to the adjustment of a machine tool for performing work operations with a high degree of precision and more particularly to the adjustment of an electrical discharge type of machine.

As a result of relatively recent developments and refinements in the electrical discharge machine art, removal of material from metallic parts has been made possible with increasing accuracy and control. The use of electrical discharge machines has thus become more widespread in connection with metal removal operations in the fabrication of master dies, for example, where metal removal by mechanical means is exceedingly difficult with any degree of precision. Because of improvements in the control and regulation of the supply of electrical energy to the electrode of an electrical discharge machine, the accuracy with which metal may be removed has reached a point where mechanical or structural factors limit accuracy rather than limitations of an electrical nature. Thus, mechanical improvements have not kept pace with the electrical precision capability of electrical discharge machines.

An important object of the present invention therefore is to provide an electrical discharge machine which from a mechanical standpoint matches the electrical precision capability of the machine.

In order to obtain accurate control during metal removal operations utilizing electrical discharge from an electrode, it is essential that adjustment of the electrode be effected along a perfectly vertical path without deviation. This requires both adequate support for the vertically movable head section of the machine carriage mounting the electrode holder as well as facilities for accurately adjusting the carriage support in situ. Thus, in accordance with the present invention four guide columns support the carriage for vertical movement, the carriage being counterbalanced and vertically displaced by a power operated piston-cylinder device. The guide columns are provided at their upper and lower ends with ball joints so that the upper and lower ends may be adjustably shifted in perpendicular directions relative to the enclosed housing from which the guide supported carriage extends cantilever fashion. The machine housing which includes a vertically elongated section enclosing the guide columns, the vertical feed piston device and the counterbalancing assembly is firmly supported on the floor by a three point support including a rear foot element and two side foot elements projecting from the base section of the housing on which the work supporting table is supported below the head section of the carriage. The base section of the housing encloses the fluid motor for the vertical feed piston device and the fluid motor for rotating the electrode spindle within the head section and the electrode holder connected thereto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged, partial top sectional view taken substantially through a plane indicated by section line 3—3 in FIG. 2.

FIG. 4 is a partial side sectional view taken substantially through a plane indicated by section line 4—4 in FIG. 3.

FIG. 10 is an enlarged partial sectional view taken substantially through a plane indicated by section line 10—10 in FIG. 4.

Figure 1:
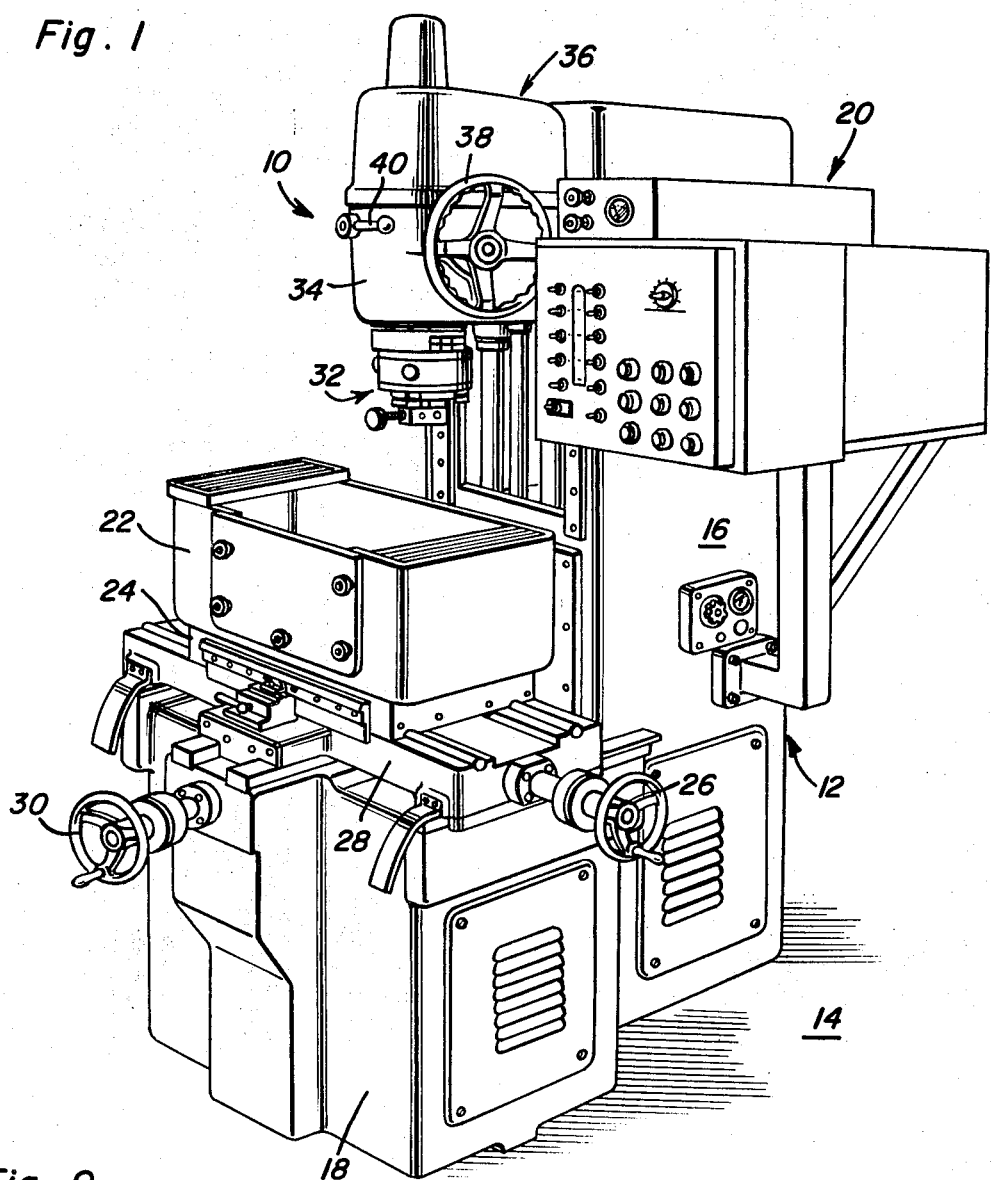
FIG. 1 is a perspective view of an electrical discharge machine constructed in accordance with the present invention.

Referring now to the drawings in detail, and initially to FIG. 1, an electrical discharge machine is shown generally denoted by reference numeral 10. The machine frame is formed by a housing generally referred to by reference numeral 12 firmly resting on a suitable floor 14 in a substantially leveled condition. The housing includes a rear, vertically elongated section 16, and a front base section 18. Supported on one side of the housing is an electrical control assembly generally referred to by reference numeral 20 through which electrical power is controlled and regulated for providing the electrical energy to effect the metal removing operation associated with electrical discharge machines. Electrical power control assemblies of this type are commercially available and in itself forms no part of the present invention. Further, the machine may also have associated therewith a dielectric filtering and storage assembly enclosed within a working tank 22 into which an electrode projects to produce an electrical discharge for metal removing purposes. The workpiece is accordingly positioned within the working tank 22 which is supported on a horizontally movable work-supporting table 24 adjustably positioned along a lateral direction through a control wheel 26. The table 24 is guidingly supported for perpendicular movement forwardly and rearwardly on a saddle 28 slidingly supported on top of the base section 18 of the housing under control of the adjustment wheel 30. Accordingly, the workpiece within the working tank 22 may be horizontally positioned below a manually adjustable electrode holder assembly 32 such as disclosed in my prior co-pending application U.S. Ser. No. 545,722, filed Apr. 27, 1966, now U.S. Pat. No. 3,474,215, issued Oct. 21, 1969.

The electrode holder is carried by a head section 34 to a vertically movable carriage assembly 36 projecting forwardly from the vertically elongated section 16 of the housing. The electrode holder 32 constituting part of the tool assembly may be manually adjusted in a vertical direction relative to the head section 34 by the vertical control handle 38 and locked in an adjusted position by means of the lock handle 40. Thus, the electrode (not shown) projecting from the holder 32 into the working tank may be vertically adjusted manually to a desired position. Course adjustment of the electrode on the other hand to a desired vertical position is effected through power operated, vertical movement of the carriage 36 as will be explained hereafter.

Figure 2:
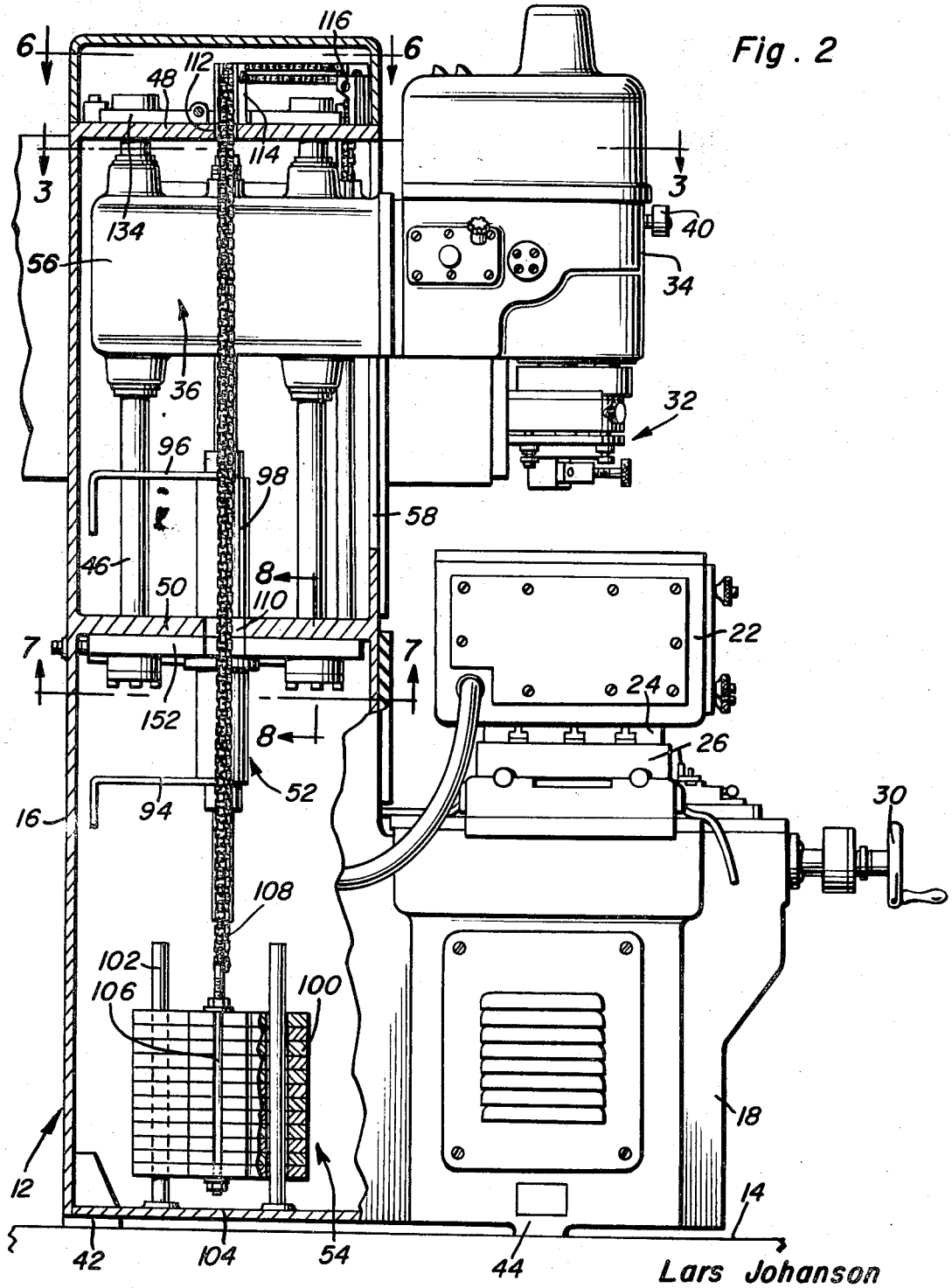
FIG. 2 is a side elevational view of the machine illustrated in FIG. 1 with parts broken away and shown in section.

The carriage 36 is supported within and projects forwardly from the vertically elongated housing section 16 above the base section 18 as more clearly seen in FIG. 2. In order to obtain mechanical accuracy, it is essential that the housing assembly 12 be firmly supported in a leveled condition on the floor 14 and that the carriage be rigidly guided for movement relative to the housing along a perfectly vertical path. The housing is therefore supported at three points on the floor 14 by a single rear foot element 42 on the housing section 16 and by a pair of side foot elements 44 disposed on laterally opposite sides of the base section 18. Within the vertically elongated housing section 16, the carriage 36 is supported and guided cantilever fashion by four guide columns 46 which extend between vertically spaced, internal housing support plates 48 and 50.

A hydraulic piston-cylinder assembly 52 is mounted by the lower housing support 50 and projects upwardly thereabove for connection to the carriage 36. Accordingly, fluid under pressure supplied to the piston-cylinder assembly will effect upward and downward movement of the carriage. A counterbalancing weight assembly 54 is also enclosed within the vertically elongated housing section 16. The counterbalancing weight assembly is suspended from the upper support 48 and connected to the carriage extending downwardly therefrom below lower support 50. The fluid pressure equipment for operating the cylinder-piston assembly 52 is enclosed within the base section 18. Thus, the weight of the machine is appropriately distributed for stable support of the machine on the floor.

Figure 5:
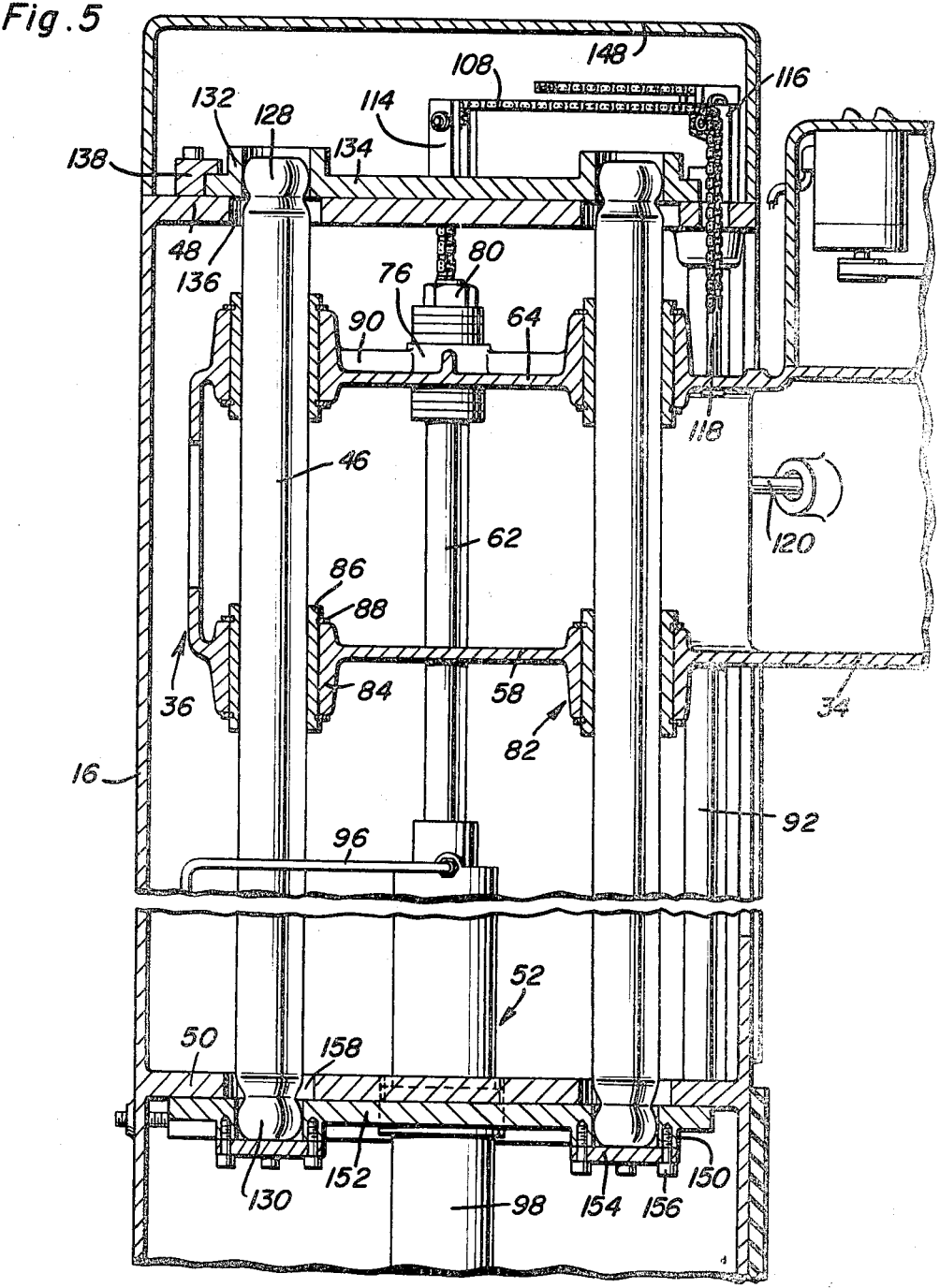
FIG. 5 is a partial side sectional view taken substantially through a plane indicated by section line 5—5 in FIG. 3.

Referring now to FIGS. 3, 4, 5, as well as FIG. 2, it will be observed that the carriage 36 includes a rear section 56 enclosed within the vertically elongated housing section 16 and connected to the head section 34 disposed externally of the housing section. A vertically elongated opening 58 is accordingly formed in the front of the vertically elongated housing section 16 through which the carriage projects. The lower wall 58 of the rear carriage section 56, is provided with an enlarged central opening 60 as more clearly seen in FIG. 4 through which the piston rod 62 projects upwardly from the assembly 52 for connection by connector 65 to the upper wall 64 of the carriage. The upper end of the piston rod is therefore provided with a reduced diameter section 66 so as to mount a pair of steel washers 68 and 70 with a rubber washer 72 sandwiched therebetween abutting the shoulder between the section 66 and the piston 62. A flanged abutment bushing 74 spaces the steel washer 70 from the upper wall 64 of the carriage concentrically aligned with the opening in an upwardly extending boss 76. An upper flanged bushing 78 is mounted within the opening surrounding the section 66 on top of the boss 76 thereby spacing another set of steel and rubber washers. The washers and bushings are held assembled on the section 66 by means of the assembly nut 80. Thus, the connection 65 established between the piston rod and the carriage, will adequately sustain the axial loads transmitted.

The connection to the piston rod 62 is centrally located relative to the four guide columns 46 that extend vertically through aligned slide bearing assemblies 82 mounted in the lower and upper walls 58 and 64 of the carriage. The slide bearing assemblies 82 are symmetrically located relative to the connector 65 and piston rod 62 more clearly seen in FIG. 3. It will be appreciated therefore, that the guide columns will be fixedly spaced relative to each other and symmetrically disposed relative to the piston rod so that the load on the guide columns will be equally distributed. This arrangement is important in order to avoid any deviation from the vertical path of the carriage because of nonuniform distribution of strain.

As more clearly seen in FIG. 5, each slide bearing assembly 82 includes an axially extending boss 84 formed in the lower and upper walls of the carriage enclosing a slide bearing sleeve 86 held axially assembled by means of a pair of thrust washers 88. The upper wall 64 of the carriage is also provided with ribs 90 extending radially from the central boss 76 to which the piston rod is connected, including ribs extending to the slide bearing assemblies 82. The upper wall of the carriage is thereby made more rigid. Also extending through the upper and lower walls of the carriage and disposed just forwardly of the guide columns, is a lock shaft 92 fixed to the upper and lower internal housing supports 48 and 50 between which the guide columns 46 extend.

Figure 6:
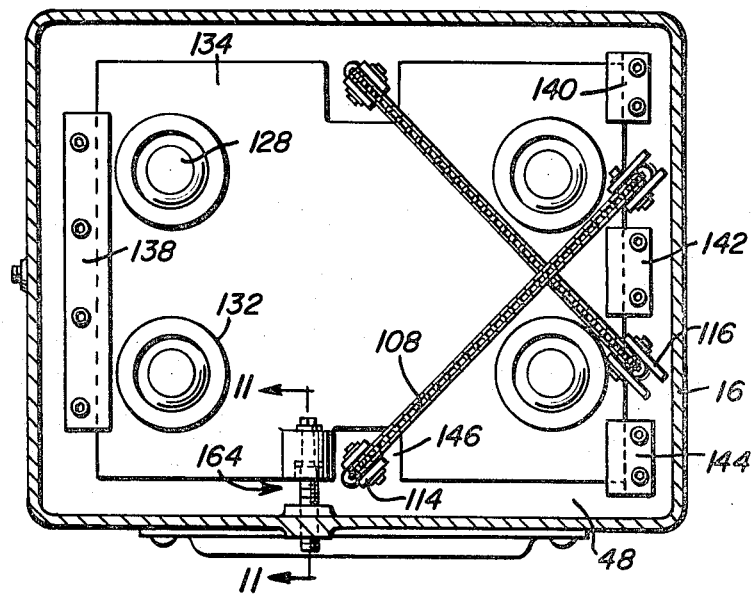
FIG. 6 is an enlarged top sectional view taken substantially through a plane indicated by section line 6—6 in FIG. 2.

Fluid under pressure supplied by conduits 94 and 96 to the lower and upper ends of the cylinder 98 associated with the piston-cylinder assembly 52 will accordingly elevate and lower the carriage assembly. The load of the carriage is balanced by the counterbalancing weight assembly which includes a stack of weights 100 slidably mounted on the guide pins 102 projecting upwardly from the bottom wall 104 of the vertically elongated housing section 16 as shown in FIG. 2, the weights being clamped together by the bolt assembly 106 to which a pair of chains 108 and 108' are connected. The weights are accordingly suspended from the chains which extend upwardly on opposite lateral sides of the carriage 36 through lateral openings 110 and 112 in the housing supports 50 and 48 respectively. The chains are entrained about idler sprocket wheel assemblies 114 and 114' mounted above the upper housing support 48 as shown in FIGS. 2 and 6. The chains cross over each other as shown in FIG. 6 and are entrained about a second pair of idler sprocket assemblies 116 and 116' mounted on top of the housing support 48 adjacent the forward side of the housing section 16 so that the chains may extend downwardly through the upper housing support 48 and be anchored to the upper wall of the carriage by anchor pins 118 as more clearly seen in FIG. 5. Each pair of idler sprocket assemblies are of different heights so that the two chains 108 and 108' will not interfere with each other as will be apparent from FIGS. 2, 4 and 5.

The carriage may be locked in any position to which it is vertically adjusted by means of the cylinder-piston assembly 52. Locking is effected by means of the lock handle 40 aforementioned. As more clearly seen in FIG. 10, the lock handle is connected to one end of a lock rod 120 rotatably and slidably mounted within a side sleeve formation 122 of the carriage by means of a bearing bushing 124. The sleeve formation 122 extends at an angle to the central plane of the machine containing the longitudinal axes of the lock shaft 92 and the piston rod 62. The lock rod 120 is connected to a clamp assembly 126 embracing the lock shaft 92. Angular displacement of the lock handle 40 in one direction will therefore firmly clamp the stationary lock shaft to the carriage in order to hold it in its vertically adjusted position. The clamp 126 is released by means of the lock handle 40 displaced in the other angular direction to permit vertical readjustment of the carriage by means of the piston-cylinder assembly 52.

Referring now to FIG. 5 in particular, it will be observed that each of the guide columns 46 is provided with an upper ball joint formation 128 and a lower ball joint formation 130. The upper ball joints are slidingly received within tubular projections 132 extending upwardly from an adjustable anchor plate 134. The projections 132 are substantially aligned with openings 136 formed in the housing support 48 on which the anchor plate 134 is slidably adjustable in one direction. Thus, guide members 138, 140, 142 and 144 are secured to the housing support 48 as more clearly seen in FIG. 6 in order to hold the anchor plate 134 assembled on the housing support and guiding it for movement along one direction. The anchor plate 134 is also provided with side cut-outs 146 between the guide members in order to accommodate upward projection of the idler sprocket assemblies 114 and 114'. A cover 148 as shown in FIGS. 4 and 5 encloses the anchor plate, idler sprocket assemblies and chains as well as the guide members for the anchor plate.

Figure 7:
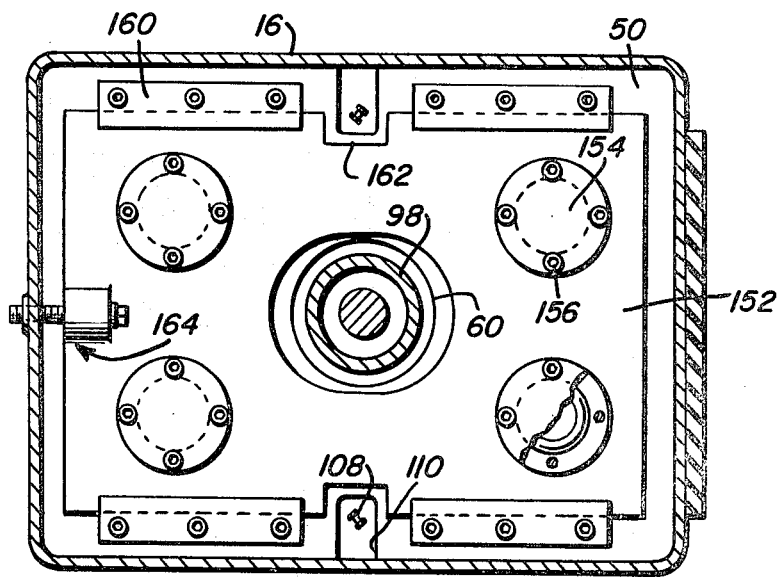
FIG. 7 is an enlarged sectional view taken substantially through a plane indicated by section line 7—7 in FIG. 2.
Figure 8:
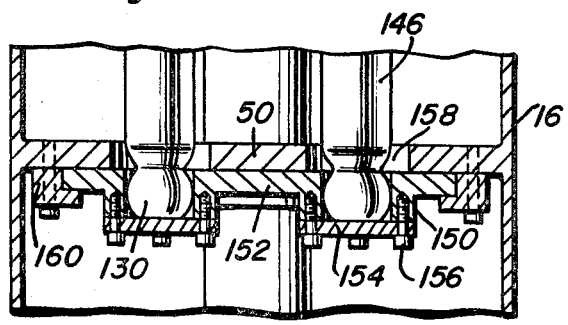
FIG. 8 is an enlarged partial sectional view taken substantially through a plane indicated by section line 8—8 in FIG. 2.

The tubular projections 132 of the upper anchor plate 134 are fixedly spaced apart in an arrangement identical to that of the downwardly extending tubular projections 150 associated with a lower anchor plate 152 as more clearly seen in FIG. 5. The lower ball joint formations 130 on the guide columns 46 are accordingly received within the tubular projections 150 above the closure discs 154 secured to the projections 150 by the fasteners 156. The lower anchor plate 152 is also slidably movable on the lower housing support 50 so that the projections 150 may be substantially aligned with openings 158 through which the guide columns extend. The lower anchor plate 152 is slidably mounted on the lower housing support 50 and held assembled on the bottom thereof by means of guide members 160 as more clearly seen in FIG. 7. The anchor plate 152 is also provided with side recesses 162 so as not to interfere with the counterbalancing chains 108 and 108' which extend downwardly through the openings 110 in the lower housing support 50. Also, the lower anchor plate 152 is confined by the guide members 160 for slidable movement in a direction perpendicular to the direction in which the upper anchor plate 134 is movable. Each of the anchor plates is adjustable to an adjusted position and held locked in such position by adjustment devices 164 and 166 which are similar to each other except for their location on the anchor plates in 90 degree relationship to each other in order to effect adjustment of the respective anchor plates in directions perpendicular to each other.

Figure 11:
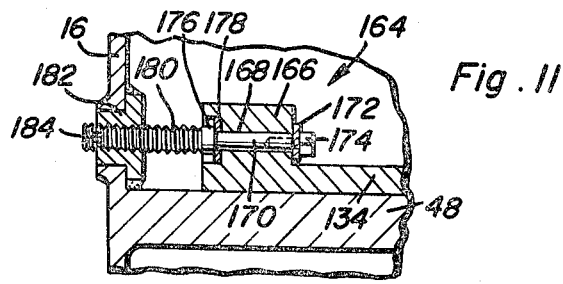
FIG. 11 is an enlarged partial sectional view taken substantially through a plane indicated by section line 11—11 in FIG. 6.

As more clearly seen in FIG. 11, the adjustment device 164 includes a projection 166 formed adjacent an edge of the anchor plate and provided with a bore 168 through which a cylindrical shaft section 170 extends in the illustrated embodiment. The cylindrical shaft section 170 is held assembled within the projection 166 by the washer 172 secured by a fastener 174 to the shaft section and a shoulder portion 176 abutting a bearing washer 178. An externally threaded screw shaft section 180 extends from the shaft section 170. Mounted in the wall of the housing section 16, and secured thereto as by welding is an internally threaded nut element 182 through which the screw shaft section 180 threadedly extends. The external end 184 of the screw section may be slotted for reception of a tool so that upon rotation of the screw section, the anchor plate connected thereto will be slidably displaced. The pitch of the screw threads is selected to effect a very fine adjustment of the anchor plate in response to rotation of the screw section as well as to be self-locking to thereby hold the anchor plate in any adjusted position to which it is displaced. Thus, the anchor plates 134 and 152 may be accurately adjusted to positions accurately aligning the guide columns 46 parallel to a vertical path after the machine housing has been firmly set and leveled on the floor. Movement of the carriage 36 along a true vertical path is thereby made possible with a high degree of precision.

Figure 9:
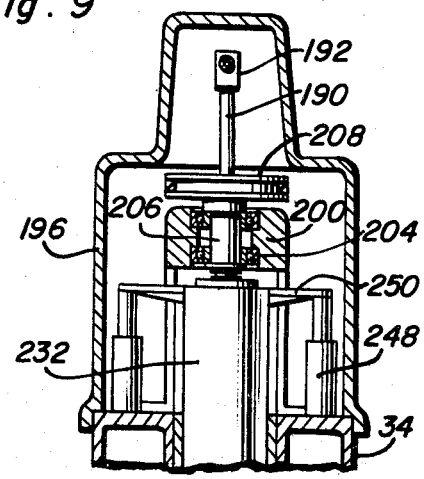
FIG. 9 is a partial sectional view taken substantially through a plane indicated by section line 9—9 in FIG. 4.

Referring now to FIGS. 3, 4 and 9 it will be observed that the head section 34 of the carriage mounts a vertical spindle 186 to which the electrode holder assembly 32 is connected at a lower end. A central passage 188 is formed within the spindle for conducting oil to the electrode. Oil is supplied to a reduced diameter, upper section 190 of the spindle through a fitting 192 connected to an oil supply hose 194. A cover 196 is mounted on the head section 34 and encloses the upper portion of the spindle together with a spindle drive assembly generally referred to by reference numeral 198, as more clearly seen in FIG. 4. The drive assembly includes a drive support bracket 200 fixedly secured to the head section 34 and provided with a mounting arm 202. Spaced bearings 204 are carried by the mounting arm for rotatably mounting a tubular shaft section 206 secured to the upper section 190 of the spindle. A pulley wheel 208 is connected to the upper end of the shaft section 206 and is drivingly connected by the endless belt 210 to a compound pulley wheel assembly including the pulley wheel 212 at the upper end of a shaft 214 rotatably mounted by spaced bearings in the bushing 216 carried by the mounting arm 202. A pulley wheel 218 is connected to the lower end of the shaft 214 and is drivingly connected by a second endless belt 220 to the drive pulley 222 driven by a fluid motor 224 secured to the head section cover 196 below the cooling vents 226. Motivating fluid for the motor 224 is supplied by flexible conduits from fluid pressure generating equipment located within the base section 18 of the housing as aforementioned. Thus, rotation is imparted to the spindle 186. Rotational support for the spindle below its upper section 190 is provided by spaced bearings 228 and 230 located adjacent the upper and lower ends of a hollow, vertical feed shaft 232, through which the spindle extends. The feed shaft is slidably mounted for vertical movement by tubular guide formations 234 and 236 projecting internally of the head section 34. Sleeve bearings 238 and 240 are accordingly mounted within the guide projections for slidably supporting the feed shaft 232. The feed shaft is also provided with a rack formation 242 intermediate the upper and lower ends thereof in meshing engagement with a pinion 244. The pinion is connected to a feed control shaft 246 rotatably mounted by the side walls of the head section 34 and to which the feed control wheel 38 is connected. It will be apparent therefore, that vertical movement may be manually imparted to the spindle 186 through the feed shaft 232 for fine adjustment purposes.

In order to facilitate vertical adjustment of the spindle 186 relative to the head section 34, the weight or load on the spindle is counterbalanced by a pair of dashpot devices 248 disposed 180 degrees apart on opposite sides of the feed shaft 232. The dashpot devices are connected to the upper end of the feed shaft 232 by arms 250 as more clearly shown in FIGS 3 and 9 and are supported on the head section 34 within the cover 196.

The spindle 186 is also locked in any position to which it is vertically adjusted relative to the head section 34 by means of the lock handle 40 aforementioned. The lock handle is therefore connected to a stem 252 threadedly mounted in the head section as shown in FIG. 4 adapted to engage a split lock bushing 254 when angularly displaced in a locking direction. The split bushing 254 is mounted by the head section 34 forwardly of the feed shaft 232 and slidably receives a lockpin 256 extending upwardly from a tubular holder 258 to which the lockpin is secured at a lower end within a mounting disc 260 to which the feed shaft 232 is connected at its lower end. Thus, by clamping the split bushing 254 about the lockpin 256 when the threaded stem 252 of the lock handle engages the bushing, the spindle assembly is vertically locked relative to the head section 34. By angular displacement of the lock handle 40 in a release direction the lockpin 256 is released to permit vertical adjustment of the rotating spindle assembly.

The foregoing is considered as illustrative only of the principles of the invention. Further, since numerous modifications and changes will readily occur to those skilled

What is claimed as new is as follows:

1. In combination with a tool assembly mounted by a carriage for vertical movement, a guide assembly for said carriage and power operated means connected to the carriage for elevating and lowering the same, said guide assembly comprising a frame, a plurality of vertical columns having upper and lower end portions, a plurality of slide bearings mounted in fixed spaced relation to each other by the carriage through which the columns extend, a pair of anchor members pivotally connected to the upper and lower end portions of said columns, means slidably mounting said anchor members on the frame for movement in parallel spaced planes, and adjustment means for displacement of said anchor members in perpendicular directions to positions establishing a precision adjusted vertical path of movement for the carriage.

2. The combination of claim 1 wherein said frame comprises a housing having a vertically elongated section enclosing the columns and a base section disposed below the tool assembly, said carriage extending from the vertically elongated section over the base section for cantilever support of the tool assembly.

3. The combination of claim 2 including a pair of side foot elements supporting the base section of the housing forwardly and laterally of the path of movement for the carriage and a rear foot element supporting the vertically elongated section of the housing rearwardly of said path.

4. The combination of claim 3 including counterbalancing means connected to the carriage within the vertically elongated section of the housing and extending therefrom below the columns.

5. The combination of claim 4 wherein said power operated means comprises a fluid operated piston device connected to the carriage symmetrically between the columns.

6. The combination of claim 5 including sliding ball joints between said end portions of the columns and the anchor members.

7. The combination of claim 6 including a lock rod fixedly mounted in a vertical position by the frame forwardly of the columns, and clamp means mounted by the carriage extending forwardly from the vertically elongated section of the housing for locking the carriage in a vertically adjusted position.

8. The combination of claim 7 wherein said tool assembly includes a head section connected to the carriage forwardly of the vertically elongated section of the housing, a spindle, and means mounting the spindle within the head section for rotational and axial movement relative to an axis parallel to said path of movement.

9. The combination of claim 8 wherein said tool assembly further includes an electrical discharge electrode mounted on a lower end of the spindle.

10. The combination of claim 1 wherein said power operated means comprises a fluid operated piston device connected to the carriage symmetrically between the columns.

11. The combination of claim 1 including sliding ball joints between said end portions of the columns and the anchor members.

12. The combination of claim 1 including a lock rod fixedly mounted in a vertical position by the frame forwardly of the columns, and clamp means mounted by the carriage extending forwardly from the lock rod for locking the carriage in a vertically adjusted position.

13. The combination of claim 12 wherein said tool assembly further includes an electrical discharge electrode mounted on a lower end of the spindle.

14. The combination with a tool assembly mounted by a carriage for vertical movement, a guide assembly for said carriage and power operated means connected to the carriage for elevating and lowering the same, said guide assembly comprising a frame, at least four vertical columns having upper and lower ball joint formations, a plurality of slide bearings mounted in fixed spaced relation to each other by the carriage through which the columns extend, a pair of anchor members slidably connected to the upper and lower ball joint formations of said columns, means slidably mounting said anchor members on the frame for movement in parallel spaced planes, and adjustment means for displacement of said anchor members in perpendicular directions to positions establishing a precision adjusted vertical path of movement for the carriage.

15. The combination of claim 14 wherein said frame comprises a housing having a vertically elongated section enclosing the columns and a base section disposed below the tool assembly, said carriage extending from the vertically elongated section over the base section for cantilever support of the tool assembly.

16. The combination of claim 15 including a lock rod fixedly mounted in a vertical position by the frame forwardly of the columns, and clamp means mounted by the carriage extending forwardly from the vertically elongated section of the housing for locking the carriage in a vertically adjusted position.

17. The combination of claim 16 wherein said tool assembly includes a head section connected to the carriage forwardly of the vertically elongated section of the housing, a spindle, and means mounting the spindle within the head section for rotational and axial movement relative to an axis parallel to said path of movement.

References Cited

UNITED STATES PATENTS

| 1,753,126 | 4/1930 | Ligon | 308—3 |
| 2,385,665 | 9/1945 | Warwick. | |
| 3,134,011 | 5/1964 | De Bruyn. | |
| 3,456,088 | 7/1969 | Trible et al. | |

RALPH F. STAUBLY, Primary Examiner

U.S. Cl. X.R.

100—258; 308—4